United States Patent Office 3,329,597
Patented July 4, 1967

3,329,597
PHOTOCHEMICAL PREPARATION OF HYDROXY-
METHYL COMPOUNDS AND THEIR DEHYDRA-
TION PRODUCTS
Karl Bernauer, Allschwil, Karlheinz Pfoertner, Basel, and
Peter Cerutti and Hans Schmid, Zurich, Switzerland,
assignors to Hoffmann-La Roche Inc., Nutley, N.J., a
corporation of New Jersey
No Drawing. Filed Sept. 3, 1963, Ser. No. 306,315
Claims priority, application Switzerland, Sept. 7, 1962,
10,634/62
8 Claims. (Cl. 204—158)

The instant invention relates to a novel method and products obtainable thereby. More specifically, the instant invention relates to a novel method in organic chemistry, applicable to organic compounds containing a nitrogen atom connected by a double bond to a carbon atom, said nitrogen atom forming part of a 5- or 6-membered heterocyclic ring which can either stand alone or be fused to other cyclic structures. Thus, the instant invention relates to a process for the preparation of hydroxymethyl organic compounds or their dehydration products, as well as salts thereof, which comprises irradiating with ultraviolet light of a wavelength between 100 A. and 2800 A., in methanolic solution, a compound selected from the group consisting of compounds containing the atomic grouping

—N=C< and quaternary salts containing the atomic grouping

wherein the nitrogen atom of the above atomic groupings is a constituent member of a heterocyclic ring containing from 5 to 6 members.

The above-described irradiation is preferably effected with ultraviolet light of a wavelength between 180 A. and 2800 A. In the case where the wavelength of the ultraviolet radiation used is above 1900 A., it is preferable to effect said irradiation in the presence of an ultraviolet sensitizing agent, preferably a di(aryl)-ketone, aryl lower alkyl ketone or di(lower alkyl)-ketone useful as an ultraviolet sensitizing agent, for example, acetone or benzophenone.

It is also advantageous to conduct the irradiation in an inert gas atmosphere, such as an atmosphere of nitrogen or argon.

The term "methanolic solution" as used herein, comprehends a solution containing methanol, which is one of the reactants. If desired, said solution may also contain inert solvents. The quantity of methanol present in said solution will depend on the quantity of the nitrogen-containing starting material to be reacted with the methanol. In order to achieve quantitative reaction, the methanol is suitably used in stoichiometric quantities or in excess. The quantitative ratio of methanol to any inert solvent is not critical. For economical reasons, however, it is preferred to use as the solvent of said solution either methanol alone or a solvent containing a substantial amount of methanol, e.g. a solution having a methanolic content of 50 percent or more on a volume basis.

The process of this invention includes not only the manufacture of hydroxymethyl compounds but also the subsequent products formed therefrom which result, for example, by the splitting off of water. By said subsequent dehydration, heterocyclic structures are obtained, for example, the oxazolidine structure is obtained by removing a mole of water from two adjacent hydroxymethyl groups, one on the nitrogen atom, and the other on the carbon atom, of the above-shown atomic groupings.

When proceeding from a non-quaternary compound with the atomic grouping

the hydroxymethylation takes place at the carbon atom $C_1$ with the elimination of the double bond to give the corresponding compound possessing the atomic grouping

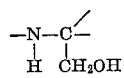

In many cases, the N-atom is also substituted to yield corresponding compounds containing the atomic grouping

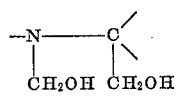

This latter grouping, upon dehydration, results in the oxazolidine structure, i.e., the corresponding compounds containing the grouping

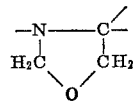

Examples of such reaction are the conversion of 4a-methyl - 1,2,3,4-tetrahydro-carbazolenine (I) into 7a-methyl-4,5,6,7-tetrahydro-oxazolo(4,3-k)-carbazole (II) and of 3,3-dimethyl-2-phenyl-indolenine (III) into 4,4-dimethyl-3a-phenyl - 3a,4-dihydro-oxazolo-(3,4-a)indole (IV):

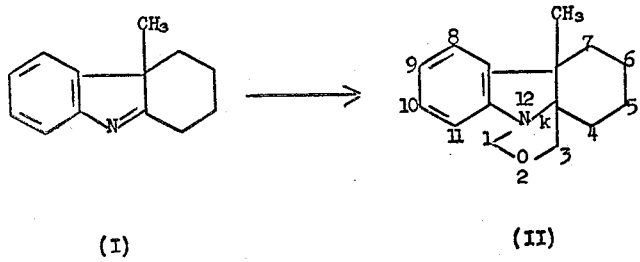

(I)            (II)

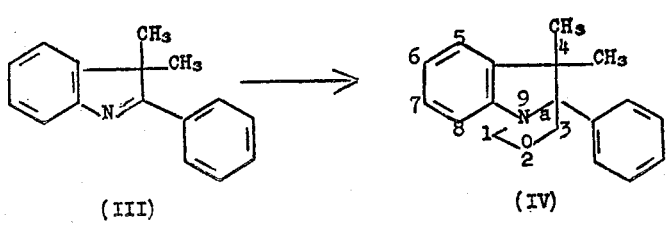

(III)            (IV)

The hydroxymethyl group is sometimes introduced onto a carbon atom which is in a vinylogous relationship to the carbon atom $C_1$ of the atomic grouping, i.e. on the $C_2$ carbon atom of the following atomic grouping:

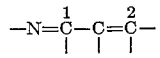

This possibility exists if the valency emanating from the carbon atom $C_1$ carries a vinyl group. The vinyl group can be part of a cyclic system. The formation of 9-methyl-9-hydroxymethyl-acridane (VI) from 9-methyl-acridine (V) is illustrative:

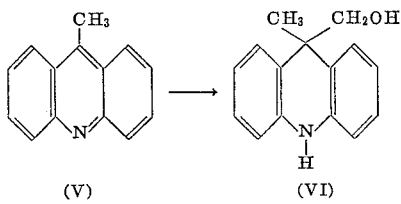

In another embodiment, the process of this invention comprises irradiating quaternary salts of compounds containing the atomic grouping

for example, quaternary salts containing the atomic grouping

In the case of these exemplary N-alkyl quaternary compounds there results, with the elimination of the double bond, N-alkyl-C-hydroxymethyl reaction products with the atomic grouping

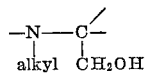

Thus, 4a,9-dimethyl-1,2,3,4-tetrahydro-carbazoleninium iodide (VII) can be converted into 4a,9-dimethyl-9a-hydroxymethyl-1,2,3,4,4a,9a-hexahydro-carbazole (VIII). Vinylogous C-hydroxymethylation of quaternized starting materials is also possible, for example 10-methyl-acridinium chloride (IX) can be converted into 9-hydroxymethyl-10-methyl-acridane (X) and 9,10-dimethyl-acridinium chloride (XI) can be converted into 9-hydroxymethyl-9,10-dimethyl-acridane (XII).

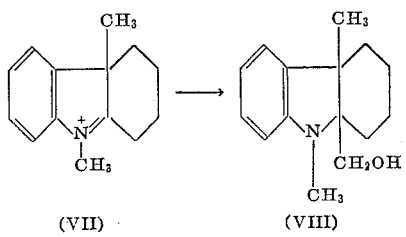

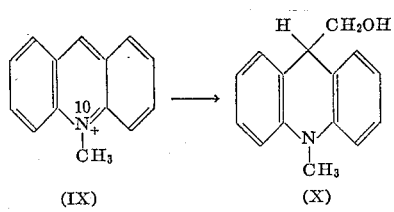

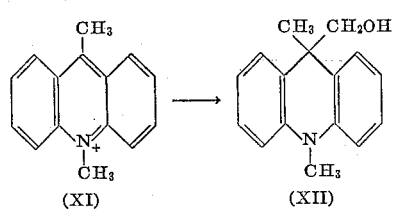

The point of entry of the hydroxymethyl group appears to be independent of process conditions employed, and is predominantly influenced by the structure of the starting material. The new method makes it possible to prepare C-hydroxymethyl compounds, previously unknown or preparable only by complicated processes, and accordingly the new method represents a useful new tool in the hands of organic chemists.

Unless the preparation thereof is described in the following examples, the starting materials employed in the method of this invention are known compounds which can be obtained, for example, according to the process of J. Am. Chem. Soc. 85, 207 (1963). The quaternary compounds used as starting materials can be obtained from tertiary amines according to known conventional quaternization methods.

According to the method of this invention, there are preparable, for example, the following new compounds, which exhibit manifold effects on the nervous system and are useful for the treatment thereof:

(a) A compound selected from the group consisting of compounds of the formula

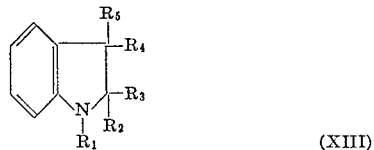

and non-toxic salts thereof, wherein $R_1$ is selected from the group consisting of, individually, lower alkyl, hydrogen and hydroxymethyl; $R_2$ is selected from the group consisting of, individually, hydroxymethyl; and $R_1$ and $R_2$, together, are the group —$CH_2$—O—$CH_2$—; $R_3$ is selected from the group consisting of, individually, phenyl; and $R_4$ is selected from the group consisting of, individually, hydrogen and lower alkyl; and $R_3$ and $R_4$, together, are the group tetramethylene; and $R_5$ is selected from the group consisting of hydrogen and lower alkyl.

(b) A compound selected from the group consisting of compounds of the formula

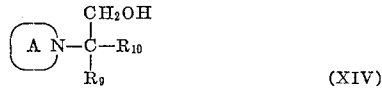

and non-toxic salts thereof, wherein the ring A containing the nitrogen atom is selected from the group consisting of pyrrolidine, piperidine, piperazine, N-carb-lower alkoxy-piperazine and morpholine; and $R_9$ and $R_{10}$ are selected from the group consisting of, together, tetramethylene, pentamethylene and hexamethylene, and, individually, are each lower alkyl.

(c) A compound selected from the group consisting of compounds of the formula

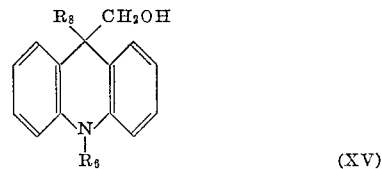

and non-toxic salts thereof, wherein $R_6$ and $R_8$ are each selected from the group consisting of hydrogen and lower alkyl.

(d) A compound selected from the group consisting of compounds of the formula

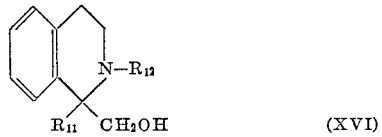

and non-toxic salts thereof, wherein $R_{11}$ and $R_{12}$ are each selected from the group consisting of hydrogen and lower alkyl.

The above compounds form salts. More particularly, they form non-toxic acid addition salts with both organic and inorganic acids, such as hydrochloric acid, hydrobromic acid, phosphoric acid, sulfuric acid, nitric acid, methanesulfonic acid, acetic acid, citric acid, p-toluenesulfonic acid, picric acid and the like. Moreover, the above compounds containing a tertiary nitrogen atom form non-toxic quaternary amonium salts with conventional quaternizing agents, for example, compounds yielding non-toxic, pharmaceutically acceptable anions, such as lower alkyl and ar-lower alkyl halides and sulfates.

Moreover, as used herein, the term "lower alkyl" comprehends both straight and branched chain saturated hydrocarbon groups, such as methyl, ethyl, propyl, isopropyl and the like. Similarly, the term "carb-lower alkoxy" comprehends groups such as, carbomethoxy, carboethoxy and the like. The term "aryl" comprehends moieties such as phenyl and the like.

The above compounds (of formulae XIII, XIV, XV and XVI) are useful as analgesics. They are also useful as psychotropic agents and as blood pressure moderating agents. Thus, the compounds of Formulae XIII, XIV, XV and XVI, or their non-toxic acid addition salts, can be used as therapeutics, for example, in the form of conventional pharmaceutical formulations. Thus, they or their pharmaecutically acceptable salts can be co-mixed with suitable pharmaceutical organic or inorganic inert carriers in order to form pharmaceutical preparations intended for enteral or parenteral administration, such as, for example, water, gelatin, lactose, starch, magnesium stearate, talc, vegetable oils, gums, polyalkylene glycols, Vaseline or the like. The pharmaceutical preparations can be in conventional solid forms, such as, tablets, dragees, suppositories, capsules or the like, or in conventional liquid forms, such as solutions, suspensions or emulsions. If desired the so-formed pharmaceutical preparations can be subjected to conventional pharmaceutical expedients, such as sterilization and can contain pharmaceutical adjuvants such as preservatives, stabilizers, wetting agents, emulsifying agents, salts used to adjust the osmotic pressure, or buffers. They can also contain other therapeutic agents.

The irradiation according to this invention can be effected by the use of any conventional source of ultra-violet light of a wavelength between 100 A. and 2800 A. A preferred range of ultraviolet radiation is that of a wavelength between 180 A. and 2800 A. For example, the irradiation can be effected with the predominantly monochromatic Hg-low pressure radiators (main emission Hg resonance line 2537 A.) Philips type 93109 E and the Hanau NK 6/20; the outer quartz mantle of the immersion lamp being removed. The irradiation was also effected with the Philips high pressure radiator type 93110 (emission of light of wavelengths 1800–3000 A.). For smaller portions of reactants there was employed as the radiator, quartz reaction vessels of 35 or 65 ml. content, with a semicircular cross-section which was suspended at a distance of a few centimeters from the burner. A blower cooler served for cooling the raditor and vessel. During the irradiation, the reaction solution was flushed with an inert gas. For special experiments, high quality optical quartz (Suprasil) cells (after Beckmann) were also used. For irradiation in high vacuum, there was employed an evacuable quartz tube which was rotated in a sloping position for the duration of the irradiation in order to achieve good intermixing of the reaction materials. For larger portions (e.g. 1–5 g. of substance), a rotatory apparatus was used in which the reaction solution was pumped in a closed system held under nitrogen, through a quartz vessel resembling a ring mantle. Here, the cooling of the lamp was also effected by means of a blower-cooler. As appreciated by those skilled in the art, the above irradiation techniques are not critical, but only illustrative. Any irradiation technique or equipment is suitable by which there can be effected irradiation of the reactants with the desired wavelength of light.

The following examples are illustrative, but not limitative, of the invention. All temperatures are in degrees centigrade.

The U.V.-absorption spectra were recorded in methanol (data in m$\mu$ and log $\epsilon$) and the IR spectra in carbon tetrachloride, unless otherwise specified.

EXAMPLE 1

*7a-methyl-4,5,6,7-tetrahydro-oxazolo(4,3-k)-carbazole*

1,22 g. of 4a-methyl - 1,2,3,4-tetrahydro-carbazolenine is irradiated in portions, each of ca. 300 mg. and each in 125 ml. of methanol, for 48 hours with the Philips lamp 93109 E. Subsequently, the solution is concentrated by evaporation in a vacuum and the residue, in benzene slou-tion, chromatographed on a silica gel (Kieselgel, Merck) (0.2–0.5 mm; 2.3 x 30 cm). First a product with an orange cer (IV) sulphate reaction is eluted in small amounts; thereafter there follows the main product (with a red cer(IV) sulphate reaction) and some unchanged starting material. After distillation at 100–110° (air bath) under 0.001 mm., there is obtained 575 mg. (51%) of the photo-product as an oil which crystallizes. M.P. (after recrystallization from pentane and methanol-water and high vacuum sublimation): 83.5°. It is 7a - methyl - 4,5,6,7-tetrahydro-oxazolo(4,3-k)-carbazole. Molecular weight determinated mass - spectrometrically: 229 (calculated: 229.34). U.V.-spectrum: $\lambda_{max}$, 237 (3.87), 283 (3.39); $\lambda_{min}$, 220 (3.54), 259 (2.93). No OH absorption in the I.R. spectrum. When air, in place of nitrogen, is conducted through the reaction solution during the irradiation no oxazolocarbazole results; only unchanged starting material is obtained besides resins.

EXAMPLE 2

*4,4-dimethyl-3a-phenyl-3a,4-dihydro-oxazolo(3,4-a) indole*

A 300 mg. portion of 3,3 - dimethyl - 2 - phenyl - indolenine in 600–700 ml. of acetone-methanol (1:1) is irradiated at room temperature for 60 hours with Hg low pressure radiator (Philips type 93109 E). All together, 1.97 g. of indolenine are reacted in this manner. The combined reaction solutions are evaporated in a vacuum and chromatographed in benzene solution on a silica gel (Kieselgel, Merck <0.08). First, a fraction with an orange cer (IV) sulphate reaction, then the main fraction with a red-orange color reaction is eluted. Subsequently, unchanged starting material follows; resinous substances remain on the column. The main photolysis product is purified by repeated chromatography on silica gel (Kieselgel) with benzene-cyclohexane (1:1) and by distillation at 130° under 0.001 mm. (320 mg., 13.5%). The crystalline product obtained melts at 90° after a two-fold resolution from pentane and high vacuum sublimation. U.V.-spectrum: $\lambda_{max}$, 235 (3.95), 283 (3.45); $\lambda_{min}$, 222 (3.78), ca. 258 (2.88). I.R-spectrum: indolenine absorption 1613 cm.$^{-1}$; no OH absorption. It is 4,4 - dimethyl-3a-phenyl-3a,4-dihydro-oxazolo(3,4-a)indole. By irradiation of the starting material under analogous conditions in pure methanol the same photoproduct is obtained. but in smaller yield.

EXAMPLE 3

*4a,9-dimethyl-9a-hydroxymethyl-1,2,3,4,4a,9a-hexahydro-carbazole*

204 mg. of 4a,9-dimethyl-1,2,3,4-tetrahydro-carbazoleninium iodide in 65 ml. of methanol and 65 ml. of acetone is irradiated for 7 hours with a Philips radiator 93109 E. After evaporation of the solvent in a vacuum, the residue, in chloroform solution, is chromatographed on silica gel (Kieselgel, Merck) (<0.08 mm.; 1.3 x 20 cm.). First, substances with an orange or red cer (IV) sulphate reaction are eluted. Subsequently, the main product with a characteristic wine-red cer (IV) sulphate reaction follows. The main product is distilled at 90–110° (air bath) in high vacuum under 0.001 mm. (54 mg.; 38.5%) and purified chromatographically several times. In this way 4a, 9-dimethyl-9a-hydroxymethyl - 1,2,3,4,4a,9a - hexahydrocarbazole is obtained as a colorless viscous oil. U.V.-spectrum: $\lambda_{max}$, 258 (3.98), 304 (3.49); $\lambda_{min}$, 226 (3.35), 281 (3.22). I.R.-spectrum (in cm.$^{-1}$): 3450 (OH), 1610 (indolin).

By irradiation of the carbazoleninium chloride in place of the iodide under the same conditions, the end product described above results in similar yield. Under the following conditions, the end product is obtained in smaller yields: By irradiation in methanol alone ($N_2$ atmosphere, radiator: Philips type 93109 E), or by irradiating in methanol or methanol/acetone with the high pressure radiator Philips type 93110 E ($N_2$ atmosphere).

EXAMPLE 4

4a,9-diethyl-9a-hydroxymethyl-1,2,3,4,4a,9a-hexahydro-carbazole 430 mg. of 4a,9-diethyl-1,2,3,4-tetrahydro-carbazoleninium chloride with 30 mg. of benzophenone in 220 ml. of methanol are irradiated for 13 hours with the Philips radiator 93109 E. After working up the reaction mixture according to the description in Example 3 above and twofold chromatography on silica gel (Kieselgel, Merck) (0.2–0.5 mm.) with methylene chloride, there is obtained, after separation of a rapidly moving fraction with an orange cer (IV) sulphate reaction and of resins, 4a,9-diethyl-9a-hydroxymethyl-1,2,3,4,4a,9a-hexahydro - carbazole as the main product. For further purification, the oil is distilled at 100–110° (air bath) under 0.001 mm. Yield 84 mg. (27%). The product gives a red cer (IV) sulphate reaction. U.V.-spectrum: $\lambda_{max}$, 263 (4.02), 308 (3.51); $\lambda_{min}$, 229 (3.39), 2.85 (3.27). I.R.-spectrum (in cm.$^{-1}$): 3484 (OH), 1605.

EXAMPLE 5

9-hydroxymethyl-10-methyl-acridane 135 mg. of 10-methyl-acridinium chloride is dissolved in 140 ml. of methanol and, irradiate with a mercury high pressure lamp for 130 minutes in a Pyrex apparatus. The solution, which is light yellow with a green fluorescence before the irradiation, is slightly brown colored and no longer shows fluorescence after the irradiation. After evaporation of same at 50–60° in a vacuum, the brown residue is taken up in a little methanol and chromatographed on a silica gel column (Kieselgel, Merck) (0.05–0.2 mm.). The forerun, which gives a light yellow color reaction with iodoplatinate solution, is rejected. The main fraction with a blue color reaction on iodoplatinate solution gives, after repeated chromatographic purification, a crystallized product which is sublimed in high vacuum at 110–120°. 28.4 mg. of 9-hydroxymethyl-10-methyl-acridane are thus obtained as white needles which melt at 132°.

A certain amount of 10-methyl-acridinium chloride always remains behind on the coating-position of the first chromatography column. The salt is removed mechanically and freed from accompanying silica gel by solution in alcohol. After recrystallization from ethanol/ether, between 45–56 mg. of starting substance can be recovered.

EXAMPLE 6

9-methyl-9-hydroxymethyl-acridane

After a three hour irradiation of 9-methyl-acridine, working up of the reaction solution and chromatography of the photoproduct according to the description in Example 5 above, there is obtained, besides a first fraction with a light yellow iodoplatinate color reaction, a second fraction with a gold-yellow iodoplatinate color reaction. This fraction is again chromatographed three times and subsequently sublimed in high vacuum. 27.9 mg. of 9-methyl-9-hydroxymethyl-acridane in the form of white, quadratic leaflets of melting point 132–135° are obtained.

EXAMPLE 7

9-hydroxymethyl-9,10-dimethyl-acridane

After a three hour irradiation of 9,10-dimethyl-acridinium chloride, working up of the reaction solution and chromatography of the photoproduct according to the description in Example 5 above, there is obtained, as the first fraction, an eluate with a deep blue iodoplatinate color reaction. After evaporation of the solvent, 28.8 mg. of 9-hydroxymethyl-9,10-dimethyl-acridane as white small crystal-needles of melting point 144–148° are obtained.

EXAMPLE 8

1-hydroxymethyl-1-pyrrolidino-cyclopentane 500 mg. of N-cyclopentylidene-pyrrolidinium perchlorate in 120 ml. of methanol in the presence of 50 mg. of benzophenone is irradiated in a nitrogen atmosphere with the Hanau lamp NK 6/20. The reaction course is followed by thin layer chromatography on silica gel (Kieselgel G, Merck; solvent, 5 percent ammonium solution in 96 percent ethanol; indicator reagent, potassium iodoplatinate solution). After establishing in this manner that the starting material is completely reacted, the reaction mixture is concentrated under reduced pressure. The residue is partitioned between 1 N hydrochloric acid and ether, and the aqueous phase twice extracted with ether. Thereafter the aqueous solution is made substantially alkaline and is then extracted with ether. The ether extract is dried with potassium carbonate and concentrated under reduced pressure. The residual colorless oil is distilled under a pressure of 0.05 mm. Hg at 30–50°. There is thus obtained a yield of 86 mg. of 1-hydroxymethyl-1-pyrrolidino-cyclopentane.

EXAMPLE 9

1-hydroxymethyl-1-pyrrolidino-cyclohexane 2.4 g. of N-cyclohexylidene-pyrrolidinium perchlorate in 900 ml. of methanol in the presence of 0.18 g. of benzophenone is irradiated under argon with the Hg-low pressure Philips lamp, type 93109 E. After irradiating for 8 hours, the reaction solution is concentrated under reduced pressure. The residue is extracted in the manner described in Example 8 above, and the extract is concentrated. The so-obtained residue is then purified by distillation in a high vacuum, yielding 1.36 g. of 1-hydroxymethyl-1-pyrrolidino-cyclohexane in the form of a colorless oil which crystallizes immediately. Recrystallization from petroleum ether yields 1.1 g. of colorless crystals melting at 70–72°.

EXAMPLE 10

1-hydroxymethyl-1-piperidino-cyclopentane 500 mg. of N-cyclopentylidene-piperidinium perchlorate in 120 ml. of methanol in the presence of 50 mg. of benzophenone was irradiated under a nitrogen atmosphere with the Hanau lamp NK 6/20. The reaction course is followed by thin layer chromatography as described in Example 8 above. When the starting material is completely reacted, the reaction solution is concentrated under reduced pressure. The residue is then treated in the manner described in Example 8 whereupon there is obtained 1-hydroxymethyl-1-piperidino-cyclopentane in the form of an oil which crystallizes after a short time. The crystals are further purified by sublimation at 60–90° (0.005 mm. Hg) and are then recrystallized from methanol/water. The so-purified product melts at 114–115°, yield 90 mg. (24.8 percent).

EXAMPLE 11

1-hydroxymethyl-1-pyrrolidino-cycloheptane 500 mg. of N-cycloheptylidene-pyrrolidinium perchlorate in 120 ml. of methanol in the presence of 50 mg. of benzophenone is irradiated in a nitrogen atmosphere for 24 hours with the Hanau lamp NK 6/20. The reaction mixture is then treated in accordance with the procedure in Example 8 above, and the so-obtained residue is distilled on an air bath at 40–60° under a pressure of 0.005 mm. Hg. This yields 1-hydroxymethyl-1-pyrrolidino-cycloheptane in the form of colorless crystals melting at 29–30° (yield 185 mg.). The picrate formed from this compound is recrystallized twice from benzene and melts at 149–150°.

EXAMPLE 12

*1-carboethoxy-4-(1'-hydroxymethyl-cyclohexyl)-piperazine*

2 g. of 1-carboethoxy-4-cyclohexen-(1)-yl-piperazine, 600 mg. of concentrated sulfuric acid, 200 mg. of benzophenone and 1000 ml. of methanol were irradiated together for 15 hours under argon with the Hanau lamp NK 6/20. The reaction mixture is then concentrated in vacuo and the residue is partitioned between 1 N sulfuric acid and ether. The aqueous solution is then extracted twice with ether, and then, with ice cooling, rendered strongly alkaline with concentrated potassium hydroxide, and then extracted with ether. The ether extract, which contains the basic reaction product, is then dried with potassium carbonate and concentrated. The so-formed oily residue is then subjected to high vacuum distillation whereby there is obtained 645 mg. of 1-carboethoxy-4-(1'-hydroxymethyl-cyclohexyl)-piperazine in the form of a coloreless oil. The infrared spectrum shows a hydroxy band at 2.88μ and a strong band at 5.92μ, which is associated with the carbamate grouping.

The above-mentioned starting material is prepared as follows: 31.6 g. of carboethoxypiperazine and 19.6 g. of cyclohexanone in the presence of a few mg. of p-toluenesulfonic acid in 300 ml. of benzene were refluxed for 22 hours in an apparatus equipped with a water separator. The reaction mixture is then concentrated to remove the benzene, and the residue is distilled at 0.01 mm. Hg. During the course of this distillation, the product 1-carboethoxy-4-cyclohexen-(1)-yl-piperazine comes over at 121° (yield 29.7 g.).

EXAMPLE 13

*1-hydroxymethyl-1-morpholino-cyclohexane*

A solution of 2.5 g. of 1-morpholino-cyclohexene, 540 mg. of concentrated sulfuric acid and 200 mg. of benzophenone in 1 liter of methanol, is irradiated under argon for 13 hours with the Hanau lamp NK 6/20. The reaction mixture is then treated in accordance with the procedure set forth in Example 8 above, and the so-obtained residue is purified via high vacuum distillation, yielding 1-hydroxymethyl-1-morpholino-cyclohexane in the form of a colorless oil which forms crystals upon standing a long time (yield 250 mg.). The infrared spectrum of this compound shows a hydroxy band at 3.15μ.

EXAMPLE 14

*4-hydroxymethyl-4-morpholino-heptane*

A solution of 366.6 mg. of 4-morpholino-3-heptene, 98.0 mg. of concentrated sulfuric acid and 40 mg. of benzophenone in 40 ml. of methanol is irradiated under a nitrogen atmosphere for 18 hours with the Hanau lamp NK 6/20. The subsequent treatment is in accordance with the procedure set forth in Example 8 above, and the so-obtained residue colorless oil is distilled on an air bath at 60–80° and 0.005 mm. Hg yielding 98 mg. of 4-hydroxymethyl-4-morpholino-heptane.

EXAMPLE 15

*1,2-dimethyl-1-hydroxymethyl-1,2,3,4-tetrahydro-isoquinoline*

400 mg. of 1,2-dimethyl-3,4-dihydro-isoquinolinium iodide [prepared from 1-methyl-3,4-dihydro-isoquinoline (Spaeth and Berger, Ber. dtsch. Chem. Ges. 63B, 134 (1930) via treatment with methyl iodide (N. Leonard, J. Amer. Chem. Soci. 71, 3408 (1949)], 80 mg. of benzophenone and 200 ml. of methanol are irradiated together under argon for 2 hours with a Hg-high pressure Philips lamp, type 93110 E. The reaction mixture is then treated according to the procedure described in Example 8 above, and the so-obtained residue is distilled in an air bath in 60–80°, 0.01 mm. Hg. The distillate is then chromatographed on a column of silica gel (Kieselgel, Merck, 0.2–0.05 mm.) with ethanolic ammonia as the elution agent, yielding 225 mg. of 1,2-dimethyl-1-hydroxymethyl-1,2,3,4-tetrahydroisoquinoline as a colorless oil. This compound is then converted into a crystalline picrate via treatment with etheric picric acid solution. Upon recrystallization from benzene, the so-obtained picrate melts at 125–127°.

We claim:

1. A process for the preparation of organic compounds which comprises irradiating with ultraviolet light of a wavelength between 100 A. and 2800 A., in methanolic solution, a compound selected from the group consisting of compounds containing the atomic grouping

and quaternary salts containing the atomic grouping

wherein the nitrogen atom of the above atomic groupings in a constituent member of a heterocyclic ring containing from 5 to 6 members.

2. A process as in claim 1 wherein the irradiation is effected with ultraviolet light of a wavelength above 1900 A. in the presence of an ultraviolet sensitizing agent.

3. A process as in claim 1 wherein the irradiation is effected with the reactants in an inert gas atmosphere.

4. A process as in claim 3 wherein the irradiation is effected with ultraviolet light of a wavelength above 1900 A. in the presence of an ultraviolet sensitizing agent.

5. A process as in claim 1 wherein hydroxymethylation occurs on both the N- and C-atoms, and which is followed by dehydration resulting in the formation of the moiety

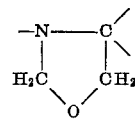

6. A process as in claim 1 wherein the compound irradiated is selected from the group consisting of compounds containing the atomic grouping

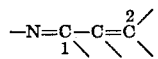

and quaternary salts containing the atomic grouping

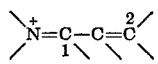

and hydroxymethylation occurs on the $C_2$-carbon atom.

7. A process as in claim 1 wherein hydroxymethylation occurs on the carbon atom of the illustrated atomic grouping.

8. A process as in claim 1 wherein the nitrogen atom of the illustrated atomic grouping is a member of a heterocyclic ring selected from the group consisting of carbazole, indole acridine, pyrrolidine, piperidine, piperazine, isoquinoline and morpholine.

References Cited

UNITED STATES PATENTS 3,060,202   10/1962   Yang _____ 204—158 X

HOWARD S. WILLIAMS, *Primary Examiner.*

ALEX MAZEL, *Examiner.*

J. TOVAR, *Assistant Examiner.*

UNITED STATES PATENT OFFICE
CERTIFICATE OF CORRECTION

Patent No. 3,329,597                                July 4, 1967

Karl Bernauer et al.

It is hereby certified that error appears in the above numbered patent requiring correction and that the said Letters Patent should read as corrected below.

Column 10, line 35, for "in a" read -- is a --.

Signed and sealed this 11th day of February 1969.

(SEAL)
Attest:

Edward M. Fletcher, Jr.                          EDWARD J. BRENNER
Attesting Officer                                        Commissioner of Patents